US006578457B2

(12) United States Patent
Eichhorn

(10) Patent No.: US 6,578,457 B2
(45) Date of Patent: Jun. 17, 2003

(54) TOOLHOLDER

(75) Inventor: Jörg Eichhorn, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/778,439

(22) Filed: Feb. 7, 2001

(65) Prior Publication Data

US 2001/0039862 A1 Nov. 15, 2001

(30) Foreign Application Priority Data

Feb. 7, 2000 (DE) ........................................ 100 05 366

(51) Int. Cl.[7] ................................................ B23B 29/00

(52) U.S. Cl. ............................ 82/160; 407/35; 82/161; 30/167; 30/168

(58) Field of Search .................. 30/167, 168; 29/566.3, 29/566.4; 82/160, 161; 81/463, 465, 466

(56) References Cited

U.S. PATENT DOCUMENTS 2,475,041 A * 7/1949 Mattson ....................... 279/19
2,839,754 A * 6/1958 Pfaff .......................... 227/147
3,074,155 A * 1/1963 Cootes et al. ............... 173/120
3,900,058 A * 8/1975 McArdle ...................... 28/122
4,133,362 A * 1/1979 Kolloch et al. ............... 30/167
5,012,709 A * 5/1991 Su .............................. 173/93
5,028,057 A * 7/1991 Wanner ...................... 279/19.3
5,542,797 A * 8/1996 Obermeier ................... 279/19
5,730,231 A 3/1998 Racodon
6,092,814 A * 7/2000 Kageler ....................... 279/14

FOREIGN PATENT DOCUMENTS

| | | |
|---|---|---|
| DE | 2620663 | 9/1977 |
| DE | 9503525 | 8/1996 |
| EP | 0494400 | 7/1992 |

* cited by examiner

*Primary Examiner*—Derris H. Banks
*Assistant Examiner*—Don Bleasdell
(74) *Attorney, Agent, or Firm*—Sidley Austin Brown & Wood, LLP

(57) ABSTRACT

A hand-operated toolholder for a chisel (1) and including a holding member for operating a chisel and having a protection flange at its end facing in a direction opposite to an operational direction (B), a tubular guide (2) for axially guiding the chisel (1) and received in the holding member (3), and a locking mechanism (6) cooperating with the tubular guide (2) for retaining the chisel in the guide.

8 Claims, 1 Drawing Sheet

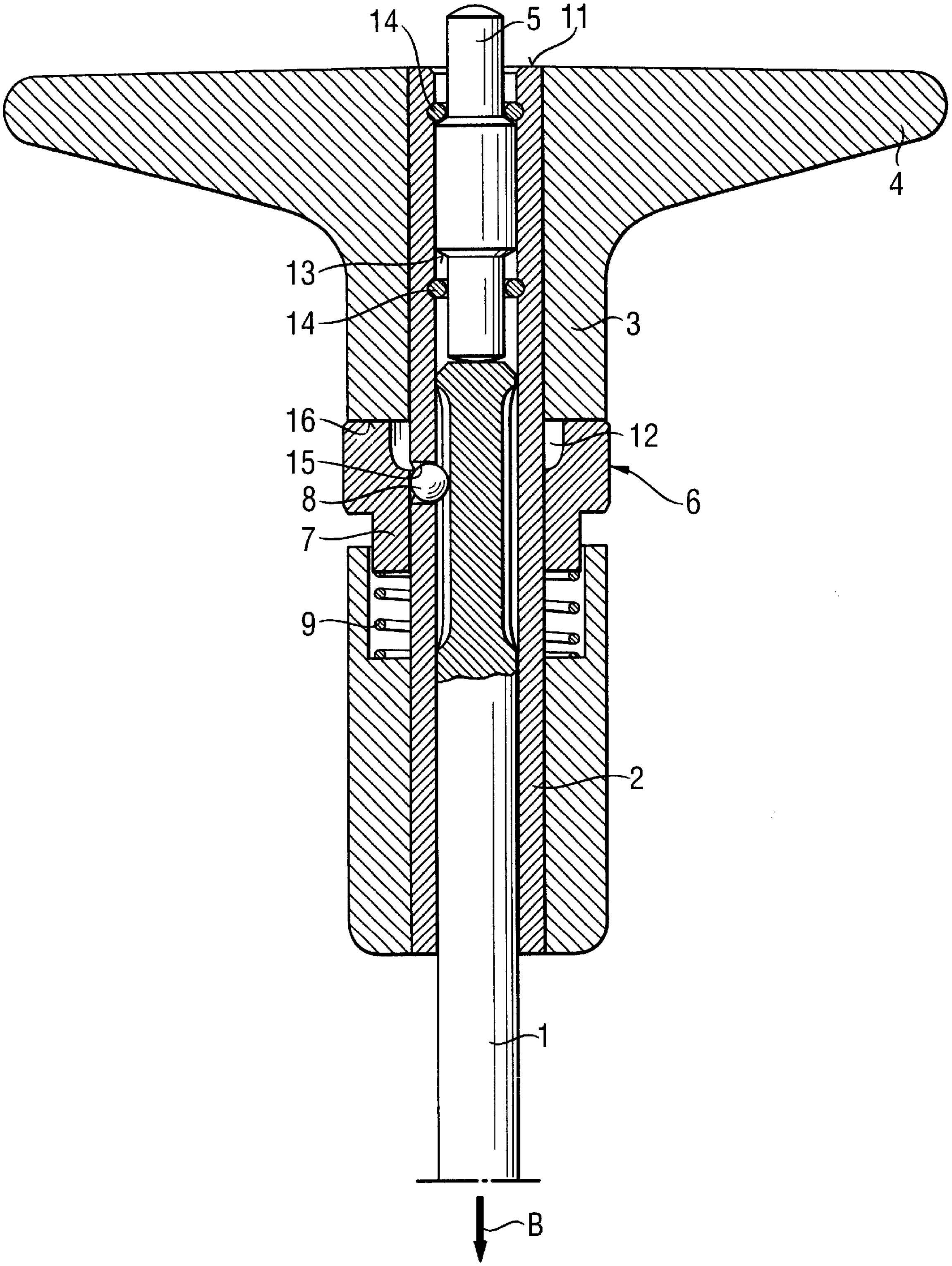
14
5
11
4
13
14
3
16
12
15
8
6
7
9
2
1
B

TOOLHOLDER

BACKGROUND OF THE INVENTION

1. Field of the Invention

The present invention relates to a hand-operated toolholder for a chisel and including a holding member for operating a chisel and having a protection flange at its end facing in a direction opposite to an operational direction, and a tubular guide for axially guiding the chisel and received in the holding member.

2. Description of the Prior Art

Hand-operated toolholders of the type described above are used for guiding of chisels, with blows being applied to the longitudinal end of the chisel, which faces in the direction opposite to the operational direction of the chisel. The blows are applied with a hand-operated hammer.

The tool or chisel holder of the above-described type are used for chiseling works on sites where no current is available, for finishing chiseling operation, or for touch-up works required for an unknown constructional component.

A hand-operated toolholder of the type described above is disclosed in German Publication DE 2 610 663A1. The known toolholder consists of a onepiece tubular plastic holder that, e.g., receives a chisel. The guide portion is formed, e.g., of four webs extending in the inner space of the holder and surrounding the chisel, with the chisel being held due to frictional engagement with the surrounding it webs. As the blows are not always applied exactly in the center of the end surface of the chisel, a blow can result in the injury of an operator's hand holding the toolholder. To prevent this, a protection flange is provided at the end of holder subjected to the hammer blows. The protection flange covers the hand of the operator holding the toolholder.

The known one-piece, hand-operated toolholder can be economically produced, however, its drawback consists in that it does not always insure the reliable holding of the chisel. The frictional engagement of the chisel with the holder can result in an uncontrolled sliding of the chisel in the holder, in particular, when the chisel is subjected to an increased loading.

Another drawback of the known toolholder consists in that a reaction feedback develops between the chisel and the hammer with which blows are applied to the chisel. As a result, the operator feels a kick each time a blow is applied to the chisel with the hammer.

Accordingly, an object of the present invention is to provide a handoperated toolholder for a chisel that would permit to separate a hand-operated hammer from the chisel.

Another object of the present invention is to provide a toolholder for a chisel which would insure a reliable guidance of the chisel in the holding member.

A further object of the present invention is to provide a modified toolholder for a chisel which can be economically produced.

SUMMARY OF THE INVENTION

These and other objects of the present invention, which will become apparent hereinafter are achieved by forming the guide portion of the holder as a tubular guide and by providing a locking mechanism which cooperates with the tubular guide for retaining the chisel.

The present invention permits to use chisels, which are used in conventional hand-held mechanized tools. The advantage of these chisels consists in that their standardized shanks provide for optimal guidance and permit their use in various tools. At the same time, the shanks provide for their use with a suitable toolholder and for reliable guidance therein. In order to insure a reliable guidance, the chisel guide in the inventive toolholder is formed as a tubular guide. This type of a chisel guide corresponds to those used in hand-held mechanized tools. The locking mechanism prevents a chisel from falling out and, thus, provides for easy handling of the hand-operated toolholder according to the present invention with a chisel used in conventional hand-held mechanized tools.

The locking mechanism advantageously includes an actuation member that at least partially surrounds the tubular guide and is displaceable against a biasing force applied by a resilient element, and a radially displaceable locking member.

The locking member, e.g., extends into the guide groove of a chisel shank and, thereby, prevents the chisel from falling out of the tubular guide as the axial displacement of the chisel is limited by end walls of the guide groove of the chisel. The radial displacement of the locking member provides for an easy replacement of a chisel in the inventive toolholder. The replacement is effected by displacing the actuation member from a position, in which it holds the locking member in engagement with the chisel shank, into a position in which the locking member can be axially displaced. The resilient member guarantees that the locking member provides for limited displacement of the chisel during operation.

Advantageously, the locking member is so formed that it functions without any disturbances and can be cost-effectively produced. The locking member is arranged in a radial bore which is formed in the tubular guide. The radial extent of the locking member advantageously exceeds the thickness of the wall of the tubular guide. This insures that the locking member can always be displaced through the bore.

Advantageously, the locking member is formed as a spherical member. The spherical shape of the locking member prevents the locking member from jamming in the radial bore of the tubular guide and provides for easy manufacturing of the locking member and simplifies the assembly of the toolholder.

Because, advantageously, the actuation member is displaced, against the biasing force, in the chisel operational direction, the user can displace it by applying force to the flange of the holding member, which contributes to easy handling of the inventive toolholder.

For cost-effective manufacturing of the actuation member, it is formed as a sleeve. When the actuation member is formed as a sleeve, the tubular guide also serves as a guide for the actuation member.

Advantageously, the actuation member has a pocket for receiving the locking member in its released position. The pocket has a depth which at least corresponds to a difference between the radical extent of the locking member and the tubular guide wall thickness.

Because, advantageously, the locking mechanism is axially spaced from end of the tubular guide facing in the direction opposite to the operational direction of the chisel, the space between the facing in the opposite direction end of the tubular guide and the locking mechanism can be used to accommodate an anvil therein which would separate, decouple, during the chiseling operation, the hammer from the chisel. In addition, the use of an anvil prevents deformation and/or material fatigue of the chisel.

Advantageously, the tubular guide has stop shoulders spaced from each other and cooperating with mating shoulders provided on the anvil for limiting axial displacement of the anvil.

In addition, the stop shoulders prevent the anvil from falling out of the tubular guide. Still further, the anvil, because of its limited axial displacement, prevents overloading of the locking mechanism.

The novel features of the present invention, which are considered as characteristic for the invention, are set forth in particular in the appended claims. The invention itself, however, both as to its construction and its mode of operation, together with additional advantages and objects thereof, will be best understood from the following detailed description of preferred embodiments when read with reference to the accompanying drawings.

BRIEF DESCRIPTION OF THE DRAWINGS

Single FIGURE of the drawing shows a cross-sectional view of a hand-operated toolholder according to the present invention.

DETAILED DESCRIPTION OF THE PREFERRED EMBODIMENT

A hand-operated toolholder according to the present invention, which is shown in the drawing, is used for operating a chisel 1, shown only partially, and an anvil 5 adjoining the chisel 1. The toolholder includes a tubular guide 2, a holding member 3 provided with a protection flange 4, and a locking mechanism 6 that cooperate with the tubular guide 2.

The locking mechanism 6 includes an actuation member 7, which is formed as a sleeve, and a spherical locking member 8. The locking member 8 is located in bore 15, which is formed in the tubular guide 2. The locking member 8 is radially displaceable in the bore 15 and has a diameter exceeding the thickness of the wall of the tubular guide 2. The inner diameter of the bore 15 in its region adjoining the inner space of the tubular guide 2 is smaller than the diameter of the locking member 8.

The actuation member 7 is displaceable in the chiseling direction against a biasing force of a resilient member 9 formed as a spring. Under the biasing force of the resilient member 9, the actuation member 7 closes, at least partially, the bore 15 at the outer circumferential surface of the tubular guide 2. Because the locking member 8 cannot be displaced radially beyond the outer surface of the tubular guide 2, and having a diameter, as discussed above, exceeding the wall thickness of the tubular guide 2, the locking member 8 projects by an amount, corresponding to the difference between its diameter and the wall thickness of the guide member 2, into the inner space of the guide member 2, forming a guide for the chisel 1.

When a sufficient force acts on the actuation member 7 in the chiseling or operational direction, it is displaced, opening the bore 15, and the locking member 8 can be displaced into a pocket 12 provided in the actuation member 7. Upon displacement of the locking member 8 into the pocket 12, it does not hold the chisel 1 any more which can now be replaced. When the force acting on the actuation member 7 is released or reduced, the actuation member 7 moves, under the action of the resilient member 9, in a direction opposite to the operational direction until the actuation member 7 abuts a stop 16 provided on on the holding member 3. Upon displacement of the actuation member 7 in the direction opposite to the operational direction B, the locking member 8 is forced out of the pocket 16 of the actuation member 7 and into the inner space of the tubular guide 2.

The distance between the locking mechanism 6 and the longitudinal end 11 of the tubular guide 2, facing in the direction opposite to the operational direction B of the tool, defines a displacement path of the anvil 5 in the tubular guide 2. The axial displacement of the anvil 5 is limited by step shoulders 14 which are provided on the tubular guide 2 and cooperate with the mating shoulders 13 of the anvil 5. The stop shoulder 14 can be formed, e.g., by a snap ring located in a recess formed in the tubular guide 2. The recess is so dimensioned that the snap ring partially projects beyond the inner surface of the guide 2.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A hand-operated toolholder for a chisel (1), comprising a holding member (3) for operating a chisel and having a protection flange (4) at an end thereof facing in a direction opposite to an operational direction (B) of the chisel (1); a tubular guide (2) for axially guiding the chisel (1) and received in the holding member (3); a locking mechanism (6) located in the holding member (3) in an axially spaced relationship with respect to a tubular guide end (11) facing in the direction opposite to the chisel operational direction (B); and an anvil (5) located in the tubular guide (2) in a space between the tubular guide end (11) facing in the direction opposite to the chisel operational direction and the locking mechansim and displaceable with the chisel (1).

2. A toolholder according to claim 1, wherein the locking mechanism comprises a radially displaceable locking member (8) for retaining the chisel (1); an actuation member (7) at least partially surrounding the tubular guide (2) for retaining the locking member (8) in a position in which the locking member (8) engages the chisel (1); and resilient means (9) for biasing the actuation member (7) into a retaining position thereof.

3. A toolholder according to claim 2, wherein the tubular guide (2) has a radial bore (15) which is formed in a wall therein, and wherein the locking member (8) has a radial extent exceeding a thickness of the tubular guide wall.

4. A toolholder according to claim 3, wherein the locking member (8) has a spherical shape.

5. A toolholder according to claim 2, wherein the resilient means (9) biases the actuation member (7) in an axial direction, with the actuation member (7) being displaceable, upon application of a force thereto, against a biasing force of the resilient means (9) for releasing the locking member (8) and thereby the chisel (1).

6. A toolholder according to claim 2, wherein the actuation member (7) is formed as a sleeve.

7. A toolholder according to claim 5, wherein the actuation member (7) has a pocket (12) for receiving the locking member (8) in a released position thereof and having a depth at least corresponding to a difference between the radial extent of the locking member (8) and the tubular guide wall thickness.

8. A toolholder according to claim 1, wherein the tubular guide (2) has stop shoulders (14) spaced from each other and cooperating with mating shoulders (13) provided on the anvil (5) for limiting axial displacement of the anvil (5).

* * * * *